United States Patent [19]

Boudy et al.

[11] Patent Number: 4,862,747
[45] Date of Patent: Sep. 5, 1989

[54] MEASUREMENT OF THE THICKNESS OF LAYERS OF MATERIAL BY ULTRASONIC INTERFEROMETRY

[75] Inventors: Pierre Boudy, Wallers; Martine Houze, Vicq Fresnes/Escaut; C. Bruneel, Famars Valenciennes; Jean L. Bigotte, Lambersart, all of France

[73] Assignee: M.T.M. Leader Sarl, France

[21] Appl. No.: 80,914

[22] Filed: Aug. 3, 1987

[51] Int. Cl.$^4$ .......................................... G01N 29/04
[52] U.S. Cl. ........................................ 73/631; 73/579
[58] Field of Search ................ 73/630, 631, 602, 627, 73/629, 900; 367/101, 102

[56] References Cited

U.S. PATENT DOCUMENTS

| | | | |
|---|---|---|---|
| 4,068,524 | 1/1978 | Lewis et al. | 73/631 |
| 4,512,194 | 4/1985 | Beuter | 73/579 |

OTHER PUBLICATIONS

Houze, M., et al., "Measurement of the Thickness of Thin Layers by Ultrasonic Interferometry", J. Appl. Phys., 55(4), Jan. 1, 1984.
Houze, M., et al., "Criteria for the Ultrasonic Measurement of Thickness by Interferometric Methods", J. Appl. Phys., 56(3), Aug. 1, 1984.

Primary Examiner—Stewart J. Levy
Assistant Examiner—Laurence G. Fess
Attorney, Agent, or Firm—Kerkam, Stowell, Kondracki & Clarke

[57] ABSTRACT

The invention relates to a method for the automatic correction of the variations of efficiency of an electroacoustic transducer as a function of the frequency for improving the accuracy of a device measuring the thickness of layers of materials by ultrasonic interferometry. It is characterized in that:
  among the echoes generated are detected, on the one hand, a beat echo characteristic of the echo interference in the medium (1) considered and, on the other hand, an echo called pilot echo offet from the beat echo and whose amplitude is characteristic of the electroacoustic conversion factor of the transducer,
  the level of the pilot echo is compared with a predetermined reference (24) and a command (25) is elaborated proportional to the detected difference,
  as a function of this command, through a corrector means (26) situated upstream of the echo processing device (9), the amplitude of the signals representative of the beat echo and of the pilot echo is influenced uniformly,
  the method is repeated from the initial step.

9 Claims, 1 Drawing Sheet

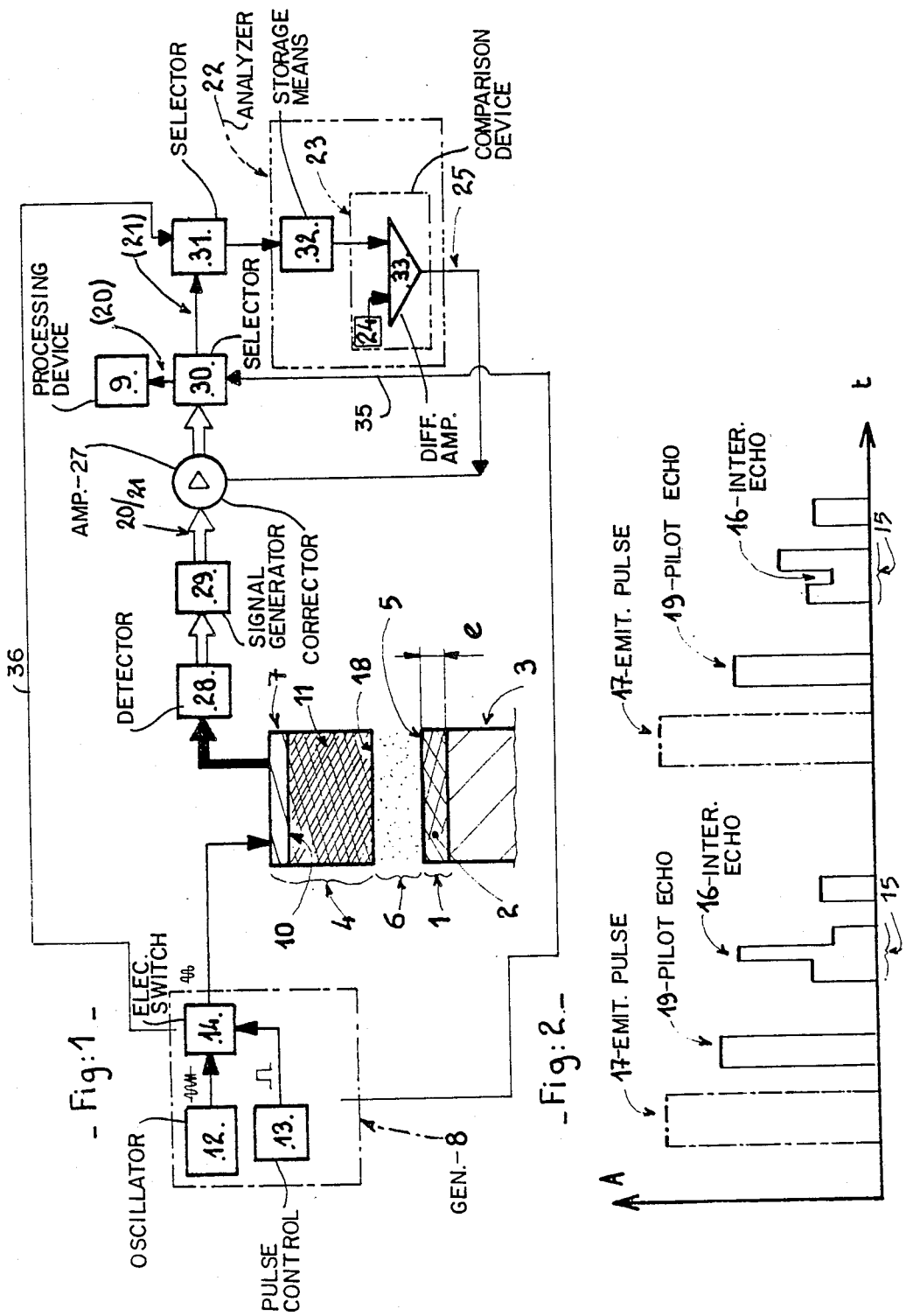

MEASUREMENT OF THE THICKNESS OF LAYERS OF MATERIAL BY ULTRASONIC INTERFEROMETRY

The invention relates to a method for automatically correcting the conversion efficiency variations of an electro-acoustic transducer as a function of frequency for improving the accuracy of a device for measuring the thickness of layers of materials by ultrasonic interferometry.

The invention also relates to means for implementing this method as well as the devices provided with such means.

The invention applies more particularly, but not exclusively, to the measurement of the thickness of a layer of the material carried by a support.

In metrology, a method is known for determining the thickness of such layers by working out a ratio between the presumed propagation speed of the ultrasounds in the material forming the layer to be measured and the travel time of an ultrasonic pulse through this layer.

For this, it is known (EP-A-0092899 and JP-A-60105906) to measure the time between the emission of an ultrasonic pulse from an external face of the layer and reception of the echo of this ultrasonic pulse reflected by the opposite internal face of the layer.

With this method, thickness measurements may be made on layers only one face of which is accessible to the probe or transducer which generates and picks up the ultrasonic pulses.

In order to optimize the measurement conditions, an automatic gain control is provided exclusively as a function of a previously established value and taking exclusively into account the nature of the layer measured.

Unfortunately, the devices putting into practice such a method, called travel time, in order to give reliable results require the thickness to be measured to be greater than a limit by about a tenth of a millimeter.

In fact, when the thickness of the layers to be measured passes below this limit, the opposite faces thereof are so close together that the echoes which they reflect back towards the transducer overlap to form substantially a single signal.

Since the separation in time of these echoes proves impossible, the so called travel time method cannot be used especially for checking the thickness of fine layers of materials, for example layers of paint whose thickness is close to a few thousandths of a millimeter.

To attempt to overcome this drawback, the duration of the ultrasonic pulse emissions may be reduced, but this solution remains above all theoretical.

This is why this technique based on the time difference separating the echo reflected by the first face and the echo reflected by the second face of the layer to be measured, so called travel time technique, must then be replaced by a technique of measuring from interferences between these two echoes, so called ultrasonic interferometric technique.

Devices are already known (EP 0062272) which include means using a metrology method by interference of an ultrasonic signal whose frequency is modulated in time.

This signal periodically scans a frequency band and the result is generally at least one beat or interference echo, the level of which is subjected to a critical evaluation. The level of this beat echo depends in fact on the electro-acoustic conversion efficiency of the transducer as a function of the frequency and of the phase difference between the two echoes which are superimposed, and thereby the thickness of the layer from which they originate.

This level may be directly used in a measurement circuit.

During frequency scanning, the appearance of so called resonance and antiresonance phenomena can be observed.

These phenomena result respectively in an increase and a decrease of the level of the echoes received representative of the interference.

To distinguish the resonance and antiresonance frequencies, the maxima and minima which result therefrom are detected.

The invention applies more particularly but not exclusively to this latter method.

It is known that the difference (DFr) and (DFar) existing respectively between two successive resonance frequencies (Fr) or two successive antiresonance frequencies (Far) are related to the thickness (e) of the material and to the propagation speed (v) of the ultrasounds in this material in accordance with the formula:

$$e = v/2DFr = v/2DFar$$

In all cases, it is known that in order to obtain optimum performances the frequency deviation must extend over a wide band and particularly in a frequency band whose limits are in a ratio of 1 to 5.

In fact, when this condition is not fulfilled, situations are met with in which two films or two layers, having different thicknesses from each other, for example in a ratio of 1 to 3, give the same image.

Unfortunately, in practice, it is difficult to provide an ultrasonic source having high and constant efficiency of a frequency range as extensive as the one mentioned above.

The result is variations of the conversion efficiency of the electro-acoustic transducer as a function of the frequency and so of the level differences which cause a modification of the interference pattern collected which may cause errors in measurement when the results obtained are analysed as a whole for determining the desired thickness.

It will be understood that the problems thus raised has no bearing on that embodiment above in connection with the travel time technique where means regulate the installation not as a function of the transducer but as a function of the nature of the layer to be measured.

This efficiency variation is particularly perceptible when, in ultrasonic interferometry, the amplitude (the minima or maxima) of the interference echoes are used directly but also when these echoes are used for determining the position of the resonance and antiresonance frequencies.

The invention proposes solving this problem by compensating for the conversion efficiency variations of the electro-acoustic transducer as a function of the frequency.

It allows then the thickness of a layer of a material to be precisely determined, independently of the variations of level of the ultrasonic signal inherent in the variation of the frequency of the ultrasonic signal.

To this end, the invention provides a method more particularly characterized in that after each emission of an ultrasonic pulse towards the medium whose thickness it is desired to be determined:

among the echoes generated are detected, on the one hand, at least one beat echo characteristic of the echo interference in the medium considered and, on the other hand, at least one echo called pilot echo temporarily offset from the beat or interference echo and whose amplitude is characteristic of the electro-acoustic conversion factor of the transducer as a function of the frequency, independently of any parameter likely to adversely affect the level thereof in a random way, signals are elaborated each representative of the amplitude of one of the echoes detected, namely a beat signal and a pilot signal, each of these beat and pilot signals are selected for addressing them, the first one to the processing device for establishing at least subsequently the thickness of the measured layer, and the second to an analysis device in which the amplitude of this pilot signal is stored, then at a chosen moment, before there is detection of the pilot and beat echoes generated by the next ultrasonic emission, in a device, the pilot signal is compared with a predetermined reference and a command is elaborated proportional to the discovered difference, as a function of this command, through a corrector means situated upstream of the device for processing the echoes, the amplitude of the signals representative of at least two echoes is influenced uniformly, comprising on the one hand the beat echo characteristic of the interference from the control medium and, on the other hand, the so called pilot echo, the method is repeated from the initial step of detecting the beat echo and the pilot echo generated by the next emission and so on.

The invention also relates to means for implementing this method as well as devices comprising such means.

It will be well understood from the following description given by way of non limitative example, with reference to the accompanying drawings which show schematically:

FIG. 1: a block diagram of an installation for implementing the method,

FIG. 2: a graph representing the spread of the echoes generated by successive ultrasonic emissions, with a time variable plotted as abscissa and a variable related to the amplitude of the echoes as ordinates.

Referring to the drawings it can be seen that, for determining the thickness "e" of a medium 1 and particularly of a layer 1 of material 2 carried by a support 3, an ultrasonic source 4 is used.

This source 4 is placed in the vicinity of the upper external face 5 of the layer 1 to be measured.

It will be noted that conventionally source 4 is not in direct contact with the external face of the layer, but on the contrary through a liquid coupling medium 6 such as water.

As can be seen in the drawings, source 4 includes a transducer element 7 for transforming an electric signal coming from a generator assembly 8 into ultrasonic vibrations.

Without it imposing a limitation on the invention, the electric signal is in the form of a train of sinusoids of progressively variable frequency and the transducer transforms this signal into an ultrasonic frequency vibration called ultrasonic pulse.

Besides its function of emitting ultrasonic waves, the transducer element 7 conventionally fulfills the function of receiving the echoes generated by the emission of ultrasonic pulses.

The echoes detected are of course transformed into electric signals which are fed to a processing device 9.

It is known that for high frequencies, particularly for above a few tens of megahertz, it is necessary to equip face 10 of transducer 7, oriented towards the layer of material to be studied, with an element 11 delaying the propagation of the ultrasonic waves.

This delaying element 11, known under the name of a delay line, generally induces a propagation delay sufficient for improving the separation between the ultrasonic pulses emitted and the ultrasonic pulses received.

The assembly formed by the source and the medium to be checked forms moreover an acoustic line.

As for the assembly generating the electric signals, although it is in no wise limitative of the invention, it consists of a device which includes mainly:

a oscillator 12 delivering a sinusoidal electric signal of constant amplitude but whose frequency varies between two limits.

a pulse control means 13, an electronic switch 14 which, driven by the pulse control means 13, chops up the signal coming from the oscillator 12 so as to obtain a succession of sinusoid trains (not shown).

As is known, it is difficult to form an ultrasonic source having a constant conversion efficiency and so constant efficiency over a frequency range as extensive as that required for the reliability of the measurement.

Now, for a controlled thickness "e", a variation of efficiency and so of amplitude of an ultrasonic pulse as a function of the frequency causes a modification of the interference pattern 15 collected and more particularly a modification of the amplitude of the beat or interference echo 16.

As was mentioned above, the direct use of these interference patterns, whatever they are, induces errors of measurement.

It can be seen in FIG. 2 that the emission 17 of an ultrasonic pulse is followed by the reception of a number of echoes and groups of echoes coming from different media through which the ultrasonic pulse passes.

In this Figure, the pulse emission 17 shown is fictitious and for this reason it has been shown with a fine dash dot line.

It is known that the delaying element 11 (delay line) has the characteristic of generating, at least through its lower face 18 forming the interface 18 between source 4 and the coupling medium, an echo 19 whose reflection coefficient does not depend on the frequency.

Although another echo 19 could be isolated and used for this purpose, it is the echo 19 of the delay element which will preferably be used as pilot echo 19 and named as such. This pilot echo 19 has its amplitude mainly related to that of the ultrasonic pulse emitted by source 4.

Since the amplitude of the ultrasonic pulse, as was mentioned above, is related to the conversion efficiency as a function of the frequency, it will then be readily understood that the amplitude of the pilot echo 19 is characteristic of the electro-acoustic conversion factor of the transducer as a function of the frequency.

The invention proposes using this discovery for automatically correcting any variation of the electro-acoustic conversion efficiency of the transducer as a function of the frequency and, to this end, after each emission 17 of an ultrasonic pulse towards medium 1 whose thickness it is desired to determine;

among the echoes generated are detected, on the one hand, at least one beat echo 16 characteristic of the echo interference in the medium 1 considered and, on the other hand, at least one echo 19 called pilot echo temporarily offset from the best echo 16 and whose amplitude is characteristic of the electro-acoustic conversion factor of the transducer independently of any parameter likely to adversely affect the level thereof in a random way, signals 20, 21 are elaborated each representative of the amplitude of one of the echoes detected, namely a beat or interference signal 16 and a pilot signal 19, each of these beat 20 and pilot 21 signals are selected for addressing them, the first one 20 to the processing device 9 for establishing at least subsequently the thickness of the measured layer, and the second 21 to an analysis device 22 in which the amplitude of this pilot signal 21 is stored, then at a chosen moment, before detection has taken place of the pilot 19 and beat 16 echoes generated by the next ultrasonic emission.

in a device 23, the pilot signal 21 is compared with a predetermined reference 24 and a command 25 is elaborated proportional to the difference discovered, as a function of this command, through a corrector means 26 situated upstream of the device 9 for processing the echoes, the amplitudes of the signals representative of at least two echoes is influenced uniformly, comprising on the one hand the beat echo 16 characteristic of the interference from the control medium and, on the other hand, the pilot echo 19.

the method is repeated from the initial step of detection of the beat echo 16 and the pilot echo 19 generated by the next emission and so on.

Adjustment of the level of the beat signal by the pilot signal emitted at a certain frequency allows beat signals to be obtained of comparable levels in time whatever the electro-acoustic conversion efficiency of the transducer as a function of the frequency.

In a preferred embodiment, the pilot echo 19 selected is the echo which appears at the level of the interface between the delay line and the coupling medium.

In a preferred embodiment of the invention, for forming the corrector means 26 for influencing the amplitude of signals 21, 20 reflecting the amplitude of the pilot 19 and best 16 echoes, an amplifier 27 is used whose gain may be adjusted as a function of the electric command signal 25.

According to a preferred embodiment of the invention:

the amplifier 27 is placed between the ultrasonic source 4 and the input of device 9 processing the echoes generated so as to amplify the level of the signals reflecting all the echoes generated.

In another embodiment of the invention (not shown) the amplifier 27 is placed between the electric signal generating assembly 8 and the ultrasonic source 4.

One or other of these two solutions gives good results.

A man skilled in the art is able to determine the reference 24 but this reference is preferably established as a function of the lowest detectable level of the beat echo and of the maximum gain of the amplifier 27.

Besides an ultrasonic source, an electric signal generating assembly, a device 9 for processing the electric signals reflecting the amplitude of the ultrasonic echoes generated in the acoustic line by the ultrasonic pulses, the means for putting the invention into practice further comprise:

a means 28 for detecting at least one beat echo 16 characteristic of the echo interference in the medium and at least one echo 19 called pilot echo temporarily offset from the beat echo 16 and whose amplitude is characteristic of the electro-acoustic conversion factor of the tranducer as a function of the frequency independently of any parameter likely to adversely affect the level thereof in a random way, a signal generator or means 29 for generating, from these echoes 16, 19, signals 20, 21 representative of their amplitude, means 30, 31 for selecting each of the beat 20 and pilot 21 signals and addressing them, the first one 20 to the processing device 9 for establishing at least subsequently the thickness of the measured layer, and the second one 21 to an analysis device 22, an analysis device 22 including: a means 32 for storing the amplitude of the pilot signal 21, substantially until detection of the pilot 19 and beat 16 echoes generated by the next emission and for addressing at the right time the pilot signal 21 stored representative of the pilot echo 19.

a means 33 for comparing this pilot signal 21 with the predetermined value 24 and for elaborating a command 25 proportional to the discovered difference, a corrector means 26 situated upstream of the device 9 for processing the echoes generated by the next ultrasonic emission and allowing the amplitude of the signals representative of at least two echoes to be influenced uniformly, including on the one hand the beat echo 16 characteristic of the interference from the control medium and the so called pilot echo 19.

In a preferred embodiment, each of the means 30, 31 is formed by an electronic gate 30, 31 driven by a signal 35, 36 synchronized with the pulse control means 13 equipping the electric signal generating assembly 8.

In a preferred embodiment, the means for comparing the amplitude of the pilot signal 21 with a preestablished reference 24 then for generating a command proportional to the difference detected is a differential amplifier.

A man skilled in the art will be able to determine the right moment for opening each of the gates 30, 31 taking into account the time distribution of the echoes after the pulse generating them.

In a preferred embodiment, the storage means 32 is formed by a sample and hold means.

Preferably, the device of the invention includes means for protecting the echo processing devices 9 and 22 from the influence of the electro-acoustic conversion efficiency variations of transducer 7 as a function of the progressively variable frequency of the sinusoid trains from the generating assembly 8.

We claim:

1. A method for the automatic correction of the conversion efficiency variations of an electro-acoustic transducer as a function of the frequency for improving the accuracy of a device measuring the thickness of layers of material by ultrasonic interferometry, which device includes:

an assembly (8) for generating electric signals of variable frequency, a source (4) transforming these electric signals into ultrasonic pulses, which source includes a transducer (7) and a propagation delay element (11)

interposed between a coupling medium (6) an a layer (1) of said material, a device (9) for collecting and processing the echoes generated by the ultrasonic pulse emissions, this method being characterized in that after each emission (17) of an ultrasonic pulse towards said layer (1) whose thickness it is desired to determine:

among the echoes generated are detected, on the one hand, at least one interference echo (16) characteristic of the echo interference in said layer (1) and, on the other hand, at least one echo (19) called pilot echo offset in time from the interference echo (16) and whose amplitude is characteristic of the electro-acoustic conversion factor of the transducer independently of any parameter likely to adversely affect the level thereof in a random way, interference and pilot signals (20, 21) are generated, each representative of the amplitude of one of the echoes detected, namely the interference echo (16) and the pilot echo (19), each of the these interference (20) and pilot (21) signals are selected for addressing them, the interference signal (20) to a processing device (9) for establishing at least subsequently the thickness of the measured layer, and the pilot signal (21) to an analysis device (22) in which the amplitude of this pilot signal (21) is stored, then at a chosen moment, before there is detection of the pilot (19) and interference (16) echoes generated by the next ultrasonic emissions, in an analyzer device 22, the pilot signal (21) is compared with a predetermined reference (24) and a command (25) is generated proportional to the discovered difference, as a function of this command, through a corrector means (26) situated upstream of the device (9) for processing the echoes, the amplitude of the signals representative of at least two echoes is influenced uniformly, comprising on the one hand the interference echo (16) and, on the other hand, the pilot echo (19), the method is repeated from the initial step of detecting the interference echo (16) and the pilot echo (19) generated by the next emission.

2. Method according to claim 1, characterized in that, jointly with the best echo (16), the pilot echo (19) is detected which had reflected from the level of the lower face (18) forming the interface between the source (4) and the coupling medium, and whose reflection coefficient does not depend on the frequency.

3. Method according to claim 1, characterized in that, for forming the means (26) for influencing the amplitude of the signals (21, 20) reflecting the amplitude of the pilot (19) and interference (16) echoes, an amplifier (27) is used whose gain may be adjusted as a function of the electric command signal (25).

4. Method according to claim 3, characterized in that the amplifier (27) is placed between the ultrasonic source (4) and the input of the device (9) for processing the echoes generated so as to amplify the level of the signals corresponding to all the echoes generated.

5. Method according to claim 3, characterized in that the amplifier (27) is placed between the electric signal generating assembly (8) and the ultrasonic source (4).

6. System for the automatic correction of the conversion efficiency variations of an electro-acoustic transducer as a function of the frequency for improving the accuracy of a device measuring the thickness of layers of material by ultrasonic interferometry characterized in that they include:

a means (28) for detecting at least one interference echo (16) characteristic of the echo interference in a layer being measured and at least one echo (19) called pilot echo offset in time from the interference echo (16) and whose amplitude is related directly to the electro-acoustic conversion factor of the tranducer independently of any parameter likely to adversely affect the level thereof in a random way, a means (29) for generating, from these interference and pilot echoes (16, 19), respectively interference and pilot signals (20, 21) representative of their amplitude, means (30, 31) for selecting each of the interference (20) and pilot (21) signals and addressing them, the interference signal (20) to a processing device (9) for establishing at least subsequently the thickness of the layer being measured, and the pilot signal (21) to an analysis device (22), said analysis device (22) including:

a means (32) for storing the amplitude of the pilot signal (21), substantially until detection of the pilot (19) and interference (16) echoes generated by the next emission and for addressing the pilot signal (21) stored representative of the pilot echo (19), a means (33) for comparing this pilot signal (21) with a predetermined value (24) and for generating a command (25) proportional to the discovered difference, a corrector means (26) situated upstream of said device (9) for processing the echoes generated by the next ultrasonic emission and causing the amplitude of the signals representative of at least two echoes to be influenced uniformly, including the interference echo (16) and the pilot echo (19).

7. System according to claim 6, characterized in that each of the means (30, 31) for selecting is formed by an electronic gate (30, 31) driven by a signal (35, 36) synchronized with a pulse control means (13) enabling an electric generator (8) which provides signals to be applied to the layer being measured.

8. System according to claim 6, characterized in that the means for comparing the pilot signal (21) with a predetermined value (24) then for generating a command proportional to the detected difference is a differential amplifier.

9. System according to claim 6, characterized in that the storage means (32) is formed by a sample and hold means.

* * * * *

UNITED STATES PATENT AND TRADEMARK OFFICE
CERTIFICATE OF CORRECTION

PATENT NO. : 4,862,747
DATED : September 5, 1989
INVENTOR(S) : BOUDY et al

It is certified that error appears in the above-identified patent and that said Letters Patent is hereby corrected as shown below:

In claim 1, column 7, line 30 "emissions" should be --emission--.

Claim 2, line 2 "best" should be --beat--.

Signed and Sealed this

Twenty-fifth Day of December, 1990

Attest:

HARRY F. MANBECK, JR.

*Attesting Officer*     Commissioner of Patents and Trademarks